United States Patent

[11] 3,618,127

| [72] | Inventor | Eric K. Pritchard |
| | | Adelphi, Md. |
| [21] | Appl. No. | 843,119 |
| [22] | Filed | July 18, 1969 |
| [45] | Patented | Nov. 2, 1971 |
| [73] | Assignee | The United States of America as represented by the Secretary of the Navy |

[54] RADIATION-HARDENED PULSE-PRODUCING SYSTEM
6 Claims, 10 Drawing Figs.

[52] U.S. Cl. .................................................. 331/54, 331/75
[51] Int. Cl. ........................................................ H03b 5/04
[50] Field of Search ............................................ 331/54, 56, 75, 114, 112, 168, 159

[56] References Cited
UNITED STATES PATENTS

| 3,219,906 | 11/1965 | Keller et al. .................. | 331/113 |
| 3,373,334 | 3/1968 | Geisz et al. .................... | 331/113 |
| 3,387,147 | 6/1968 | Radwan .......................... | 331/112 |

Primary Examiner—John Kominski
Attorneys—R. S. Scisscia and J. A. Cooke

ABSTRACT: A radiation-hardened pulse-producing system having an oscillator, a buffer amplifier and a saturable core transformer for producing output pulses. Current feedback loops from the output winding of the transformer to the input winding of the transformer, including blocking oscillators, insure at least a predetermined time delay between output pulses will be maintained if the system is subjected to a radiation environment.

INVENTOR
Eric K. Pritchard

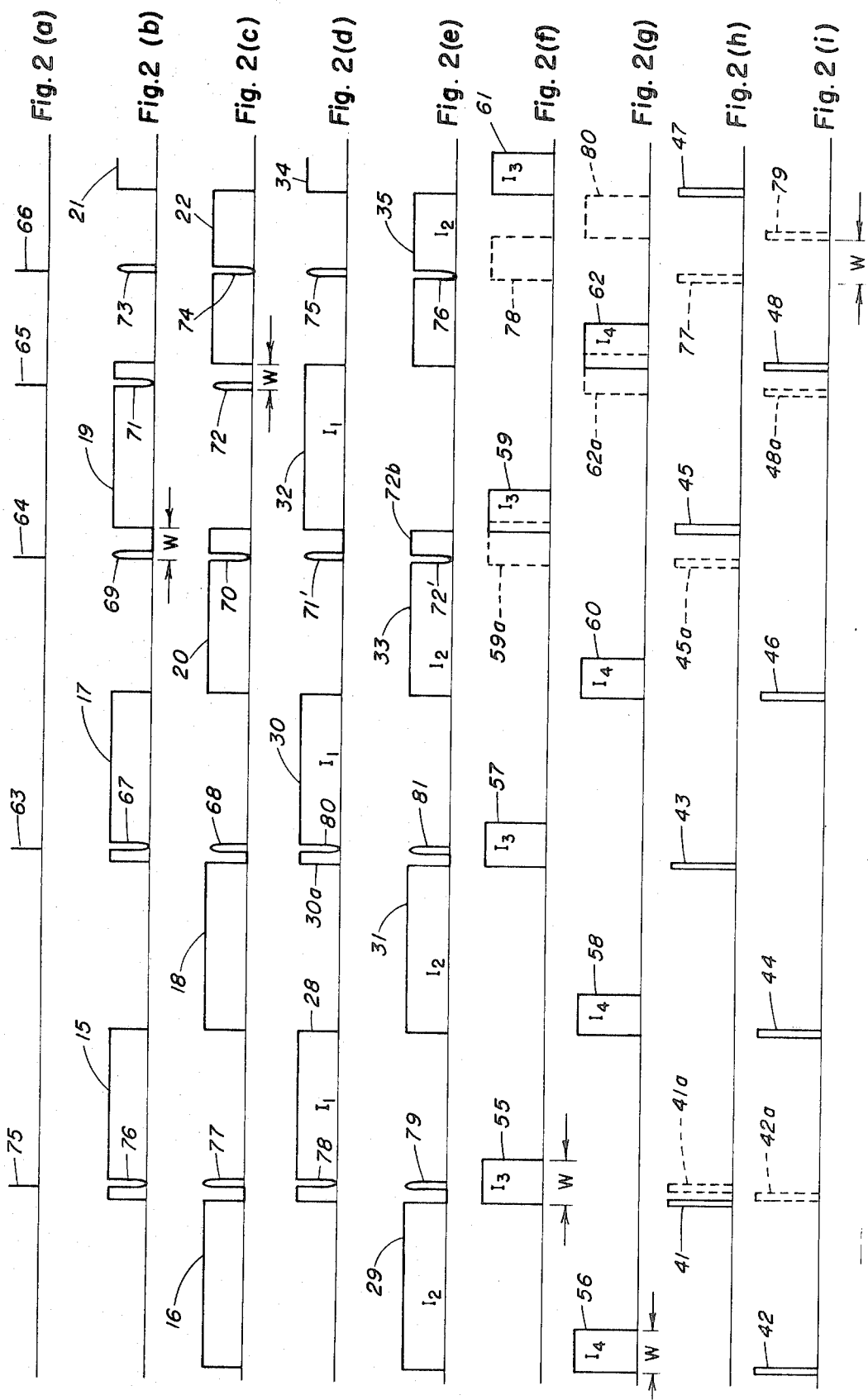

RADIATION-HARDENED PULSE-PRODUCING SYSTEM

BACKGROUND OF THE INVENTION

This invention relates generally to radiation-hardened signal-generating systems and more particularly to a radiation-hardened pulse-producing oscillator system.

System hardening may be broadly defined as any technique utilized in obtaining radiation tolerant systems, that is systems unaffected by the presence of gamma radiation or the like. The presence of such radiation, absent hardening techniques, will cause premature or other undesirable operation of systems utilizing semiconductor circuit components. Thus, in the case of an oscillator system, which may include an oscillator employing semiconductive circuit components, utilized to provide timing pulses for logic or the like, gamma bursts may cause spurious output pulses which may destroy the logic load attached to the system output.

To overcome undesirable operation of systems employing semiconductor devices subjected to gamma radiation, system-hardening techniques have been devised. These hardening techniques have included component selection and use, cancellation, time sequencing, circumvention and modification of the environment. These heretofore employed techniques are somewhat unreliable, expensive, or otherwise inadequate and therefore, have been unable to provide systems adequately immune to gamma or other nuclear radiation. For example, prior art system hardening utilizing cancellation techniques have required careful matching of circuit components and may be ineffective if the radiation level of the environment is changed. Similarly, prior art system-hardening techniques utilizing time sequencing may be inapplicable if shutdown time may not be tolerated in the output, while hardening utilizing redundant systems are both bulky and uneconomical.

SUMMARY OF THE INVENTION

Accordingly, one object of the invention is to provide an improved radiation immune signal-generating system.

Another object of the present invention is to provide an improved radiation-hardened oscillator system.

A still further object of the present invention is to provide a radiation-hardened time base system for a logic output load.

Another object of the instant invention is to provide a radiation-hardened circuit system employing semiconductor components that is economical, reliable, and simple in operation.

These and other objects of the present invention are obtained by providing a radiation-hardened system utilizing a push-pull oscillator to provide output pulses and feedback initiated by the output pulses, by way of blocking oscillators, to eliminate spurious outputs caused by gamma or other nuclear radiation.

BRIEF DESCRIPTION OF THE DRAWING

A more complete understanding of the invention and many of the attendant advantages thereof will be readily appreciated as the same becomes better understood by reference to the following detailed description when considered in connection with the accompanying drawings wherein:

FIG. 2 is a graphical view showing various signals in conjunction with the system of the present invention.

DESCRIPTION OF THE PREFERRED EMBODIMENT

Figure 1:
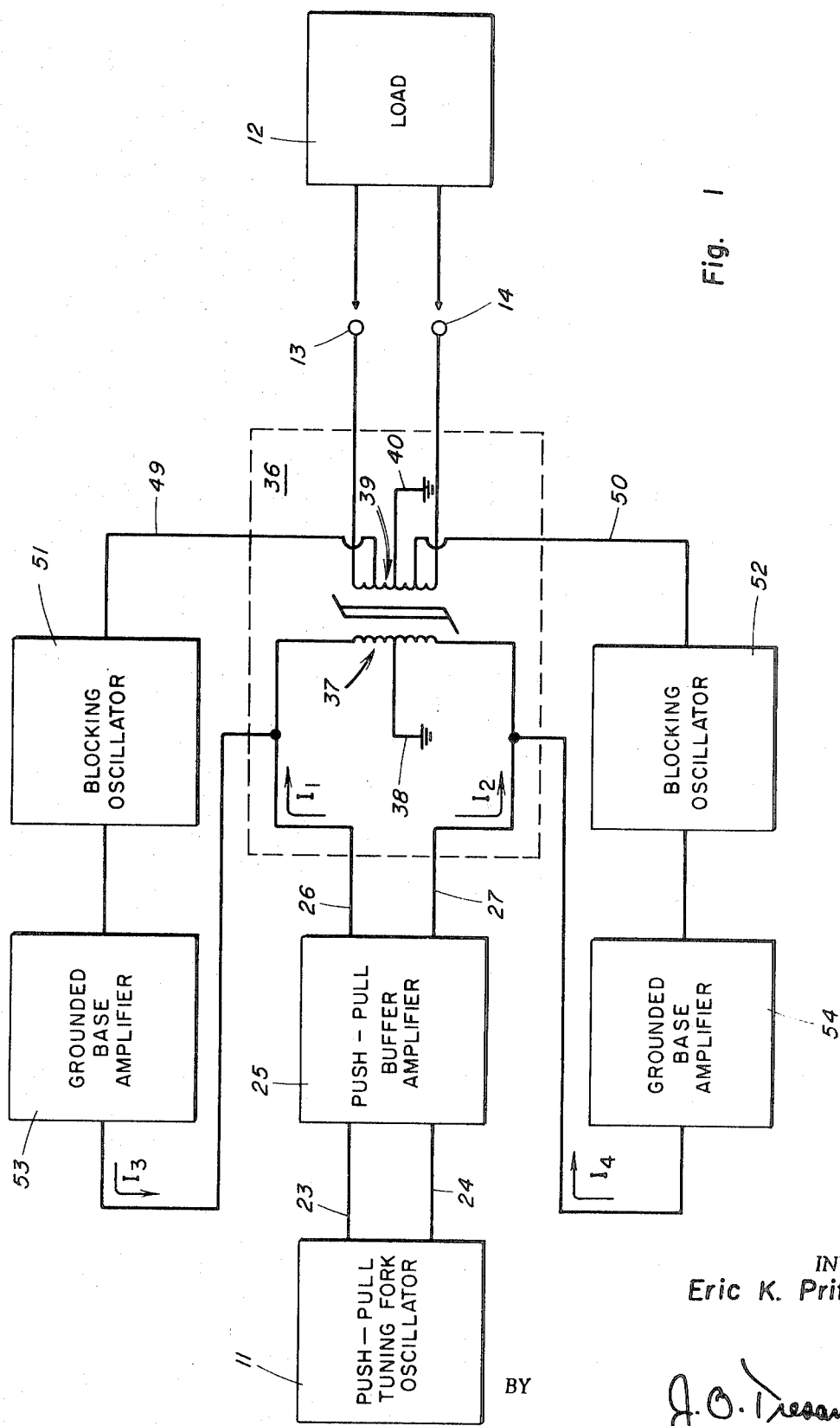
FIG. 1 is a schematic view of the radiation-hardened oscillator system according to the present invention.

Referring now to the drawing and more particularly to FIG. 1 thereof wherein the radiation-hardened oscillator system is shown as including an oscillator 11 which may be, by way of example, a push-pull tuning fork oscillator including semiconductor components (not shown) or the like of a type well known in the art adapted, as hereinafter explained, to provide timing pulses to a load 12 which may be connected to output terminals 13 and 14 of the system.

As shown in FIGS. 2(b) and 2(c), tuning fork oscillator 11 may provide reference pulses 15, 17, 19 and 21 and reference pulses 16, 18, 20 and 22 at oscillator outputs 23 and 24, respectively. Connected to oscillator outputs 23 and 24 is a buffer amplifier 25 of a type well known in the art and so arranged, in push-pull operation, to provide current pulses $I_1$ and $I_2$ at buffer amplifier outputs 26 and 27, respectfully, responsive to the output from oscillator 11. Thus, as readily apparent from FIG. 2(d), $I_1$ current pulse 28 is responsive to oscillator output pulse 15, $I_1$ current pulse 30 is responsive to pulse 17, and so on. Similarly, FIG. 2(e) indicates that $I_2$ current pulses 29, 31, 33 and 35 are responsive to oscillator output pulses 16, 18, 20 and 22, respectively. Current pulses $I_1$ and $I_2$ alternately flow, via buffer amplifier outputs 26 and 27, to an output coupling device such as an output transformer indicated at 36. More particularly, output transformer 36, as hereinafter explained, may provide output pulses at terminals 13 and 14 to load 12 and may be a square loop saturable core transformer. The transformer may include an input winding 37 connected across buffer amplifier output 26 and 27 and having a ground centertap at 38 and an output winding 39 connected across output terminals 13 and 14 and having a ground centertap 40. The output from winding 38 may provide, as shown in FIGS. 2(h) and 2(i), narrow pulses 41, 43, 45 and 47 and 42, 44, 46 and 48 at output terminals 13 and 14, respectively, which may be supplied to load 12.

Furthermore, a portion of the output from winding 39 may be fed, via leads 49 and 50, to trigger blocking oscillators 51 and 52, respectively. The outputs of the blocking oscillators may be amplified, for example by grounded base amplifiers 53 and 54 connected to the blocking oscillators, to obtain pulses $I_3$ and $I_4$. Referring to FIGS. 2(f) and 2(g), it is readily apparent that $I_3$ current pulse 55 is of a width W, wherein W is less than the duration of $I_1$ pulse 28, and of a magnitude greater than that of the $I_1$ pulse. Similar to the corresponding $I_1$ pulses, however, $I_3$ current pulses 55, 57, 59 and 61 are responsive to oscillator output pulses 15, 17, 19 and 21, respectively. Similarly, $I_4$ pulses 56, 58, 60 and 62, of widths W and magnitudes greater than the $I_2$ pulses, are responsive to oscillator output pulses 16, 18, 20 and 22, respectively.

In operation, it is desirable that narrow pulses 41, 43, 45 etc. and narrow pulses 42, 44, 46 etc. be alternately applied at terminals 13 and 14, respectively, for transfer to load 12. By way of example, the delivered narrow pulses may perform switching functions, may act as a time base, or the like, for load 12 which may advantageously include logic circuitry.

For desirable operation, as hereinbefore explained, it may be required that the pulses appearing on terminals 13 and 14 alternate. It may also be required that there be at least a predetermined time delay between a pulse appearing at terminal 13 and one appearing at terminal 14. As previously explained, however, if prior art pulse producing systems are subjected to a radiation environment, spurious output pulses may result. This may cause either two pulses sequentially occurring at one output terminal or may cause the output pulses to alternate without a sufficient delay between alternate pulses, either situation may cause irreparable injury to the load by destroying the stored logic or the like. The system of the present invention precludes these deleterious effects of radiation by utilizing positive current feedback to insure proper delivery of pulses to the load.

Referring to FIG. 2(a) of the drawing, there is shown gamma or other radiation pulses 63, 64, 65, 66 and 75. These pulses may be representative of environmental conditions or the like and may be such as to cause spurious output pulses or irregularities, 67, 69, 71, 73 and 76 and 77, 68, 70, 72 and 74 at oscillator output 23 and 24. These gamma bursts are such, absent radiation system hardening, to effect current change from buffer amplifier 25 and subsequent pulse output change at 13 and 14. More particularly, a gamma burst occurring during oscillator output 15 will cause a deviation 76 and 77 in the oscillator output and a corresponding change in buffer amplifier current output causing a momentary decrease 78 in $I_1$ current pulse 28 and an additional current pulse 79 in the $I_2$ direction. Assuming that output pulses from transformer 36 appear at 13 and 14 only during a change of primary current direction, current pulses 78 and 79 will produce additional narrow output pulses 41a and 42a. These additional and premature narrow pulses may destroy the logic stored in load 12 if they occur too close in time to each other. If, however, positive feedback via blocking oscillator 51 is present, a change in current from $I_1$ to $I_2$ would not affect the direction of current flow through winding 37 since blocking oscillator current $I_3$ is greater in magnitude than $I_1$ or $I_2$. More particularly, assume gamma burst 63 occurs, sufficient in strength to cause deviations 67 and 68 in the oscillator output and a momentary cessation 80 in $I_1$ current pulse 30 with a corresponding additional $I_2$ pulse 81. However, the leading edge 30a of $I_1$ pulse 30 has already triggered blocking oscillator 51 to provide $I_3$ pulse 57. Since the magnitude of $I_3$ pulse 57 is greater than $I_1$ pulse 30 or $I_2$ pulse 81, there is no net change in direction of current through winding 37 and no additional spurious output to load 12 is produced.

Two additional situations are possible and represented by gamma bursts 64 and 66. Burst 64 represents a burst occurring within a time W, equal to the blocking oscillator width, before the oscillator 11 is to change outputs. Burst 64 causes deviations 69 and 70 in oscillator output at 23 and 24, respectively, causing in turn an additional $I_1$ pulse 71' and hiatus 72' in $I_2$ pulse 33. The leading edge of pulse 71' triggers blocking oscillator 51 which provides $I_3$ pulse 59a. The change in current flow in winding 37, from the $I_2$ direction to the $I_1$ direction (which is the same as the $I_3$ direction), causes a narrow pulse 45a to be provided at 13. No additional narrow pulse is caused when the current goes back to $I_2$ at portion 72b of pulse 33 since the occurrence of $I_3$ pulse 59a, of greater magnitude than 72b, keeps the current flow in the coil in the same ($I_1$) direction so that no output due to $I_2$ is produced. By the time blocking oscillator pulse 59a ceases, oscillator 11 has switched so that $I_1$ pulse 32 is present, thus there is no further change in direction of current flow through winding 37 (and no additional narrow output pulse) until $I_2$ occurs at 35. The effect of gamma burst 64, occurring within a time W before pulse 19, is to shift earlier in time normal output pulse 45 to that of 45a. Of course, the hereinbefore description is applicable to gamma burst 65 which causes a shift from pulse 48 to that of 48a and provides a $I_4$ current pulse 62a.

Gamma burst 66 presents the situation where an additional pair of narrow pulses are produced. Burst 66 causes deviations 73 and 74 in oscillator outputs 23 and 24 with corresponding current changes 75 and 76. The net direction of current flow changes from that in the $I_2$ direction (immediately before burst 66) to that in the $I_1$ (pulse 75) direction causing a narrow output pulse 77 to be produced. Additionally, pulse 75 triggers blocking oscillator 51 to provide $I_3$ pulse 78. Similarly to the situations of bursts 64 and 65, the return of pulse 35 after hiatus 76 does not immediately change the net direction of current flow since $I_3$ pulse 78 is present and dominates the flow direction. When pulse 78 ceases, the net current direction changes to the $I_2$ direction and an narrow output 79 is produced along with a triggering of blocking oscillator 52 and the production of $I_4$ pulse 80. Thus, it is readily apparent that the effect of burst 66 is to cause an extra pair of output pulses 77 and 79 to be delivered to load 12. It is noted, however, that pulses 77 and 79 differ in time by the blocking oscillator width W. Thus, if the blocking oscillator width W is chosen to be greater than the maximum rate between pulses delivered to the load, no damage will result.

Obviously, numerous modifications and variations of the present invention are possible in light of the above teachings. Thus, any reference source which may provide reference inputs to the buffer amplifier may be used. Similarly, the individual circuitry such as the oscillator, amplifiers, blocking oscillators and the like may individually include radiation hardening features which may supplement the radiation system-hardening technique of the present invention. It is therefore to be understood that within the scope of the appended claims the invention may be practiced otherwise than as specifically described herein.

What is claimed as new and desired to be secured by Letters Patent of the United States is:

1. A radiation-hardened pulse-producing system comprising: oscillator means for producing alternately occurring reference signals,
   amplifier means coupled to said oscillator means and responsive to said alternately occurring reference signals for providing an output of alternately first occurring current pulses,
   transformer means the primary of which is coupled to said amplifier means and responsive to the initiation of said first alternately occuring current pulses for providing second alternating narrow current pulses in the secondary to a load, and
   positive feedback loop means coupled between the secondary and primary of said transformer means and responsive to the initiation of said first alternately occurring current pulses for superimposing additional current pulses upon the output of said amplifier means to maintain the correct direction and timing of pulse current flow in the secondary of said transformer means when said system is subjected to gamma radiation.

2. A radiation-hardened pulse-producing system according to claim 1 wherein
   said amplifier means responsive to said alternating reference signals is a buffer amplifier.

3. A radiation-hardened pulse-producing system according to claim 1 wherein
   said transformer means is a saturable core transformer.

4. A radiation-hardened pulse-producing system according to claim 1 wherein
   the magnitude of said additional current pulses supplied to said primary winding is greater than the output of said amplifier means.

5. A radiation-hardened pulse-producing system according to claim 1 wherein
   said positive feedback loops further include blocking oscillators.

6. A radiation-hardened pulse-producing system according to claim 1 wherein
   said oscillator means for producing alternately occurring reference signals is a push-pull oscillator.

* * * * *